US011712047B2

(12) United States Patent
Smith et al.

(10) Patent No.: US 11,712,047 B2
(45) Date of Patent: *Aug. 1, 2023

(54) FLOW BALANCING IN FOOD PROCESSOR CLEANING SYSTEM

(71) Applicant: TAYLOR COMMERCIAL FOODSERVICE, LLC, Rockton, IL (US)

(72) Inventors: Nathan E. Smith, Hamlin, NY (US); Robert Tuchrelo, Williamson, NY (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,484

(22) Filed: Oct. 18, 2021

(65) Prior Publication Data

US 2022/0046946 A1 Feb. 17, 2022

Related U.S. Application Data

(63) Continuation of application No. 16/502,707, filed on Jul. 3, 2019, now Pat. No. 11,147,291, which is a
(Continued)

(51) Int. Cl.
*A23G 9/30* (2006.01)
*B08B 9/032* (2006.01)
(Continued)

(52) U.S. Cl.
CPC ............... *A23G 9/30* (2013.01); *B08B 9/027* (2013.01); *B08B 9/0323* (2013.01); *B67D 1/07* (2013.01); *B67D 2001/075* (2013.01)

(58) Field of Classification Search
CPC ...... A23G 9/30; B67D 1/07; B67D 2001/075; B67D 1/0834; B08D 9/0321;
(Continued)

(56) References Cited

U.S. PATENT DOCUMENTS 730,463 A * 6/1903 Keyt ...................... F16K 1/446
  137/527.2
766,764 A * 8/1904 Keyt ...................... E03C 1/284
  137/340
(Continued)

FOREIGN PATENT DOCUMENTS

CN 1731947 2/2006
CN 201832821 U 5/2011
(Continued)

OTHER PUBLICATIONS

Canadian Office Action in corresponding CA Application No. 2,924,481, dated Mar. 13, 2017 (5 pages).
(Continued)

*Primary Examiner* — David Colon-Morales
(74) *Attorney, Agent, or Firm* — Barnes & Thornburg LLP

(57) ABSTRACT

A plurality of bypass lines are configured to selectively engage a corresponding plurality of food flow paths in a food processor. Each bypass line fluidly communicates with an inlet of a pressure regulating valve such that a common pressure occurs at a spaced position in each food flow path providing an equal pressure at the pressure regulating valve.

16 Claims, 3 Drawing Sheets

Related U.S. Application Data continuation of application No. 15/374,058, filed on Dec. 9, 2016, now Pat. No. 10,368,564.

(60) Provisional application No. 62/266,243, filed on Dec. 11, 2015.

(51) Int. Cl.
  *B08B 9/027* (2006.01)
  *B67D 1/07* (2006.01)

(58) Field of Classification Search
  CPC ............... B08D 9/0323; B08D 9/0325; Y10T 137/86815; Y10T 137/87571; Y10T 137/87676
  See application file for complete search history.

(56) References Cited

U.S. PATENT DOCUMENTS

| | | | | |
|---|---|---|---|---|
| 1,903,735 A * | 4/1933 | Krieger | ............... | E03C 1/308 4/255.06 |
| 1,963,784 A * | 6/1934 | Freund | ............... | D01H 7/62 137/207.5 |
| 2,196,176 A * | 4/1940 | Brigham | ............... | B08B 9/0321 137/239 |
| 2,278,034 A * | 3/1942 | Arnold | ............... | E03C 1/284 4/679 |
| 2,563,385 A * | 8/1951 | Warcup | ............... | B67D 1/07 222/145.2 |
| 2,617,491 A * | 11/1952 | Ross | ............... | F16K 15/03 137/527.8 |
| 2,961,853 A * | 11/1960 | Cohrt | ............... | A23G 9/16 62/517 |
| 3,044,483 A * | 7/1962 | Wilburn | ............... | B67D 1/0829 137/239 |
| 3,120,326 A * | 2/1964 | Hedeman | ............... | B67D 1/07 222/145.2 |
| 3,273,585 A * | 9/1966 | Patch | ............... | A23G 9/30 137/240 |
| 3,566,904 A * | 3/1971 | Davis | ............... | G21C 15/18 137/403 |
| 3,729,177 A * | 4/1973 | Keyes | ............... | A23G 9/30 134/132 |
| 3,898,859 A * | 8/1975 | Duke | ............... | A23G 9/12 62/201 |
| 4,330,245 A * | 5/1982 | Billett | ............... | A23G 9/26 425/126.2 |
| 4,378,034 A * | 3/1983 | Albertson | ............... | F02B 77/04 141/1 |
| 4,404,040 A * | 9/1983 | Wang | ............... | C11D 3/2079 510/491 |
| 4,417,610 A * | 11/1983 | Waldstrom | ............... | B65B 3/36 222/61 |
| 4,479,423 A * | 10/1984 | Schwitters | ............... | A23G 9/30 99/453 |
| 4,555,820 A * | 12/1985 | Dragstrem | ............... | E03C 1/304 4/255.06 |
| 4,703,628 A * | 11/1987 | Togashi | ............... | F25D 19/04 62/348 |
| 4,848,381 A * | 7/1989 | Livingston | ............... | B67D 1/07 141/90 |
| 4,860,550 A * | 8/1989 | Aoki | ............... | A23G 9/163 62/135 |
| 4,941,593 A * | 7/1990 | Hicks | ............... | B08B 9/0323 134/169 C |
| 5,330,769 A * | 7/1994 | McKinzie | ............... | A01N 25/02 510/491 |
| 5,436,008 A * | 7/1995 | Richter | ............... | C11D 7/266 424/405 |
| 5,463,878 A * | 11/1995 | Parekh | ............... | F25B 47/022 62/394 |
| 5,535,923 A * | 7/1996 | Fujioka | ............... | B67D 1/07 137/212 |
| 5,615,695 A * | 4/1997 | Chambers | ............... | F28G 9/00 134/102.1 |
| 5,700,494 A * | 12/1997 | Masse | ............... | A23G 9/283 426/516 |
| 5,738,002 A * | 4/1998 | Marano-Ducarne | ............... | A47J 31/4485 99/323.1 |
| 5,911,813 A * | 6/1999 | Jensen | ............... | A23G 3/0294 99/452 |
| 5,948,439 A * | 9/1999 | Forman | ............... | A61K 9/0007 424/466 |
| 6,086,833 A * | 7/2000 | Conners | ............... | A61L 2/202 99/534 |
| 6,136,362 A * | 10/2000 | Ashton | ............... | A23L 3/18 99/453 |
| 6,149,731 A * | 11/2000 | Ko | ............... | B08B 9/00 134/29 |
| 6,363,549 B2 | 4/2002 | Humpert et al. | | |
| 6,472,358 B1 * | 10/2002 | Richter | ............... | C11D 3/2079 510/234 |
| 6,490,872 B1 * | 12/2002 | Beck | ............... | A23G 9/228 62/342 |
| 6,553,779 B1 * | 4/2003 | Boyer | ............... | A23G 9/045 62/342 |
| 7,401,613 B2 * | 7/2008 | Carhuff | ............... | A47J 31/46 134/22.12 |
| 7,681,761 B2 * | 3/2010 | Harra | ............... | A23G 9/281 222/145.5 |
| 8,205,460 B2 * | 6/2012 | Russo | ............... | A23G 9/06 62/303 |
| 9,516,889 B2 * | 12/2016 | Tuchrelo | ............... | A47J 31/60 |
| 9,962,035 B2 | 5/2018 | Tuchrelo et al. | | |
| 10,368,564 B2 * | 8/2019 | Smith | ............... | B08B 9/027 |
| 11,147,291 B2 * | 10/2021 | Smith | ............... | A23G 9/30 |
| 2001/0017485 A1 * | 8/2001 | Yoo | ............... | H02J 3/007 307/66 |
| 2003/0012864 A1 * | 1/2003 | Gerber | ............... | B01F 35/2206 426/665 |
| 2003/0085237 A1 * | 5/2003 | Kateman | ............... | A23G 9/228 99/450.7 |
| 2004/0001906 A1 * | 1/2004 | Carhuff | ............... | B08B 9/0321 426/130 |
| 2004/0011384 A1 * | 1/2004 | Jager | ............... | A47J 31/60 99/279 |
| 2004/0118291 A1 | 6/2004 | Carhuff et al. | | |
| 2004/0172204 A1 * | 9/2004 | Eaton | ............... | H02J 3/46 702/57 |
| 2005/0128659 A1 * | 6/2005 | Hibi | ............... | H02J 13/00016 361/20 |
| 2006/0097003 A1 * | 5/2006 | Emmendoerfer | ...... | B08B 9/0325 222/1 |
| 2007/0062212 A1 * | 3/2007 | Frank | ............... | A23G 9/28 62/342 |
| 2007/0231440 A1 * | 10/2007 | Taketsuka | ............... | A23C 11/103 426/565 |
| 2008/0223410 A1 * | 9/2008 | Molloy | ............... | B08B 9/0325 134/113 |
| 2009/0014464 A1 * | 1/2009 | Adbelmoteleb | ...... | B67D 1/0028 222/1 |
| 2009/0117242 A1 * | 5/2009 | Kateman | ............... | A23G 9/42 426/474 |
| 2009/0120306 A1 * | 5/2009 | DeCarlo | ............... | A23G 9/224 62/340 |
| 2009/0285966 A1 * | 11/2009 | Tso | ............... | A23L 27/28 222/144.5 |
| 2010/0049455 A1 * | 2/2010 | Scholtz | ............... | H02P 9/105 702/60 |
| 2010/0058772 A1 | 3/2010 | Russo et al. | | |
| 2010/0062128 A1 * | 3/2010 | Khoo | ............... | A23F 5/465 426/474 |
| 2010/0136148 A1 * | 6/2010 | Saint Victor | ............... | C11D 3/48 424/754 |
| 2011/0073618 A1 * | 3/2011 | Anderson | ............... | B67D 1/07 222/145.2 |

(56) References Cited

U.S. PATENT DOCUMENTS

| | | | | |
|---|---|---|---|---|
| 2011/0197920 | A1* | 8/2011 | Kenowski | B08B 9/027 134/10 |
| 2011/0246686 | A1* | 10/2011 | Cavanagh, Jr. | G06F 13/28 710/22 |
| 2013/0140328 | A1* | 6/2013 | Gates | A47J 31/469 134/22.18 |
| 2013/0253059 | A1* | 9/2013 | Man | A01N 37/02 514/557 |
| 2013/0328389 | A1* | 12/2013 | Ayana | H02J 9/00 307/9.1 |
| 2014/0030203 | A1* | 1/2014 | Dombeck | A61K 8/365 424/65 |
| 2015/0306639 | A1* | 10/2015 | Cocchi | A23G 9/30 134/18 |
| 2015/0306640 | A1* | 10/2015 | Lazzarini | B08B 9/08 134/18 |
| 2016/0176693 | A1* | 6/2016 | Lawler | B67D 1/07 222/148 |

FOREIGN PATENT DOCUMENTS

| | | |
|---|---|---|
| CN | 203081844 U | 7/2013 |
| CN | 204620567 U | 9/2015 |
| DE | 2106223 | 8/1972 |
| DE | 102011075624 | 11/2012 |
| EP | 0260649 | 3/1988 |
| EP | 1716760 | 11/2006 |
| EP | 2615469 | 7/2013 |
| GB | 1562274 | 3/1980 |
| JP | S-61282040 | 12/1986 |
| JP | H-032432 | 1/1991 |
| JP | H-067755 | 1/1994 |
| WO | 95/15090 | 6/1995 |
| WO | 00/70963 | 11/2000 |
| WO | 2009/059405 | 5/2009 |
| WO | 2010/002644 | 1/2010 |
| WO | 2014/003881 | 1/2014 |
| WO | 2015/028523 | 3/2015 |
| WO | 2015/038360 | 3/2015 |

OTHER PUBLICATIONS

Canadian Office Action in corresponding CA Application No. 3,007,499, dated Apr. 2, 2019 (6 pages).
Chinese Office Action in corresponding Chinese Application No. 201480061343.7, dated May 26, 2017.
Chinese Patent Office, Second Office Action for corresponding CN Patent Application No. 201480061343.7 dated Jan. 2, 2018.
Chinese Patent Office, Third Office Action for corresponding CN Patent Application No. 201480061343.7 dated Jul. 24, 2018.
Chinese Patent Office, First Office Action from Chinese Patent Application No. 201680072254.1 dated Oct. 29, 2020.
Chinese Patent Office, Second Office Action from Chinese Patent Application No. 201680072254.1 dated Jul. 1, 2021.
Chinese Patent Office, Third Office Action from Chinese Patent Application No. 201680072254.1 dated Aug. 13, 2022.
European Patent Office (EPO), Supplementary Partial European Search Report from corresponding European Patent Application No. 16873991.0 dated May 22, 2019.
European Search Report in corresponding EP Application No. 14844644.6, dated Apr. 6, 2017 (12 pages).
HealthPro Brands: "Fit Antibacterial Fruit & Vegetable Wash"—Oct. 3, 2006.
Hydra Rinse (TM) Operator's Manual (Model TAYHR794; Model TAYHRC713), Authors: Anonymous, Publication data: Hydra Rinse (TM) Operator's Manual,,Oct. 29, 2013,Idea Boxx, US.
Hydra Rinse Two Stage Demo' (Idea Boxx) Nov. 10, 2014 [online] retrieved from <URL: https:/lwww.youtube.com/watch?v=ISOmmBp4do> (screen capture attached for NPLD3).
Hydra RinseTM Operator's Manual (Idea Boxx) Oct. 29, 2013.
Hydra RinseTM Single Stage Demo Video' (Idea Boxx) Nov. 10, 2014 [online] retrieved from <URL: https://www.youtube.com/watch?v=pxpROVOqzyA> (screen capture attached for NPLD2).
International Search Report and Written Opinion for PCT/US2016/065982 (12 pages), dated Feb. 28, 2017.
International Search Report and Written Opinion from corresponding International Application PCT/US2018/017659 dated Apr. 11, 2018 (14 pages).
International Search Report and Written Opinion of the International Searching Authority in corresponding International Application No. PCT/US2014/053495, dated Dec. 11, 2014 (8 pages).
IP Australia, Examination Report No. 1 from corresponding AU Patent Application No. 2016366559 dated Jun. 18, 2019.
IP Australia, Examination Report No. 1 from corresponding AU Patent Application No. 2014318188 dated Oct. 18, 2016.
IP Australia, Examination Report No. 1 from corresponding AU Patent Application No. 2018200423 dated Oct. 11, 2018.
Zhao et al.: "Inactivation of *Salmonella* and *Escherichia coli* O157:H7 on Lettuce and Poultry Skin by Combinations of Levulinic Acid and Sodium Dodecyl Sulfate"—Journal of Food Protection, vol. 72, No. 5, 2009; pp. 928-936.

* cited by examiner

FLOW BALANCING IN FOOD PROCESSOR CLEANING SYSTEM

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to food processors and particularly to selectively cleaning a food flow path in the food processor, and more particularly to a method and apparatus for providing substantially equal pressures within the food flow paths during passage of a solution through the food flow paths from a common source pressure.

Description of Related Art

It is generally understood that fluid dispensing systems having fluid lines that carry fluids to a point of use need cleaning from time to time in order to ensure that no deposits or microorganisms collect in the fluid lines. For example, beverage distribution systems employ the use of beverage lines to carry beverages from beverage containers, or tanks, to dispensing units, which dispense the beverages to drinking containers. If for some reason, these beverage lines are not cleaned on a regular basis, the collection of bacteria and deposits therein may contaminate the beverages thereby making the beverages unsafe to drink. Moreover, in commercial restaurant settings, food and health regulations actually require the periodic cleaning of beverage dispensing systems.

Similarly, food processors having a food flow path require periodic rinsing, cleaning and/or sanitizing.

It is well known to use portable chemical dispenser systems to clean out beverage lines and other components of beverage dispensing systems. With these portable systems, users have become quite effective in meeting the various requirements imposed by food and health regulations. However, these prior art methods are extremely time consuming and require the attention of at least one person to manually move the chemical dispense systems between each of the various beverage lines that require cleaning in a particular beverage dispense system. To add to the frustration, more and more restaurants are offering a larger variety of beverages than offered in years past, thereby making an extremely time demanding process even more demanding.

Therefore, a need exists for a system assisting in predictable exposure of food flow paths to known solutions, such as cleaning, sanitizing, disinfecting or rinsing.

BRIEF SUMMARY OF THE INVENTION

In one configuration, the present disclosure provides a food processor having a first food flow path extending from a first upstream portion to a first downstream portion; a second food flow path extending from a second upstream portion to a second downstream portion; a first bypass line configured to connect to the first food flow path; a second bypass line configured to connect to the second food flow; and a first pressure regulating valve having a pressure regulating valve inlet and a pressure regulating valve outlet, wherein the pressure regulating valve inlet fluidly communicates with the first bypass line and the second bypass line.

A further configuration includes an apparatus having a first bypass line having a first interface configured to connect to a first food flow path of a food processor; a second bypass line having a second interface configured to connect to a second food flow path of the food processor; and a pressure regulating valve having a pressure regulating valve inlet and a pressure regulating valve outlet, the pressure regulating valve inlet in fluid communication with the first bypass line and second bypass line for regulating a pressure in the first bypass line and second bypass line.

A method is disclosed including fluidly connecting a bypass line to each of a plurality of food flow paths in a food processor, each bypass line in fluid communication with (i) any remaining bypass lines and (ii) an inlet of a pressure regulating valve; and passing a solution through a portion of each of the food flow paths pass through the pressure regulating valve.

A further method includes providing a bypass line configured to fluidly connect to a food flow path of a food processor; and fluidly communicating a pressure regulating valve with the bypass line to provide a pressure regulation of a flow of solution in the food flow path.

In one alternative configuration, the present disclosure provides a food processor including a first food flow path extending from a first upstream portion to a first downstream portion; a second food flow path extending from a second upstream portion to a second downstream portion; a first bypass line connected to the first upstream portion; a second bypass line connected to the second upstream portion; and a first pressure regulating valve in at least one of the first bypass line and the second bypass line.

In a further configuration, a shunt fluidly connects the first bypass line to the second bypass line upstream of the pressure regulating valve.

In the alternative configuration, it is contemplated the first pressure regulating valve is in the first bypass line and a first anti-siphon valve is located in one of the first food flow path and the first bypass line. Further, a second anti-siphon valve can be located in one of the second food flow path and the second bypass line.

Further, in the alternative configuration, the first pressure regulating valve and the second pressure regulating valve can have substantially equal cracking pressures. Alternatively, the first pressure regulating valve can have a greater cracking pressure than the second pressure regulating valve. Further, the first pressure regulating valve can have a smaller cracking pressure than the second pressure regulating valve. It is understood the pressure regulating valves can have one of a predetermined, fixed, and adjustable cracking pressure. In one configuration, the first anti-syphon valve is intermediate the first upstream portion and the pressure regulating valve.

An alternative method is also provided including fluidly connecting a bypass line to each of a plurality of food flow paths in a food processor, each bypass line including a pressure regulating valve; passing a solution through the plurality of food flow paths and each corresponding pressure regulating valve; and passing solution from each corresponding pressure regulating valve.

In the alternative method, at least one bypass line includes an anti-siphon valve and each pressure regulating valve has a predetermined cracking pressure.

The methods contemplate the solution passing through at least a portion of each food flow path in either a forward or a reverse direction.

A further alternative apparatus is provided having a first bypass line having a first interface for connection to a first food flow path of a food processor; the first bypass line having a first pressure regulating valve; a second bypass line having a second interface for connection to a second food flow path of the food processor; the second bypass line having a second pressure regulating valve; wherein the first pressure regulating valve and the second pressure regulating valve are selected to provide predetermined solution pressures at the first pressure regulating valve and the second pressure regulating valve in response to a common solution pressure spaced from the first pressure regulating valve and the second pressure regulating valve. This apparatus can further include an anti-siphon valve in at least one of the first bypass line and the second bypass line.

BRIEF DESCRIPTION OF THE SEVERAL VIEWS OF THE DRAWING(S)

DETAILED DESCRIPTION OF THE INVENTION

Figure 1:
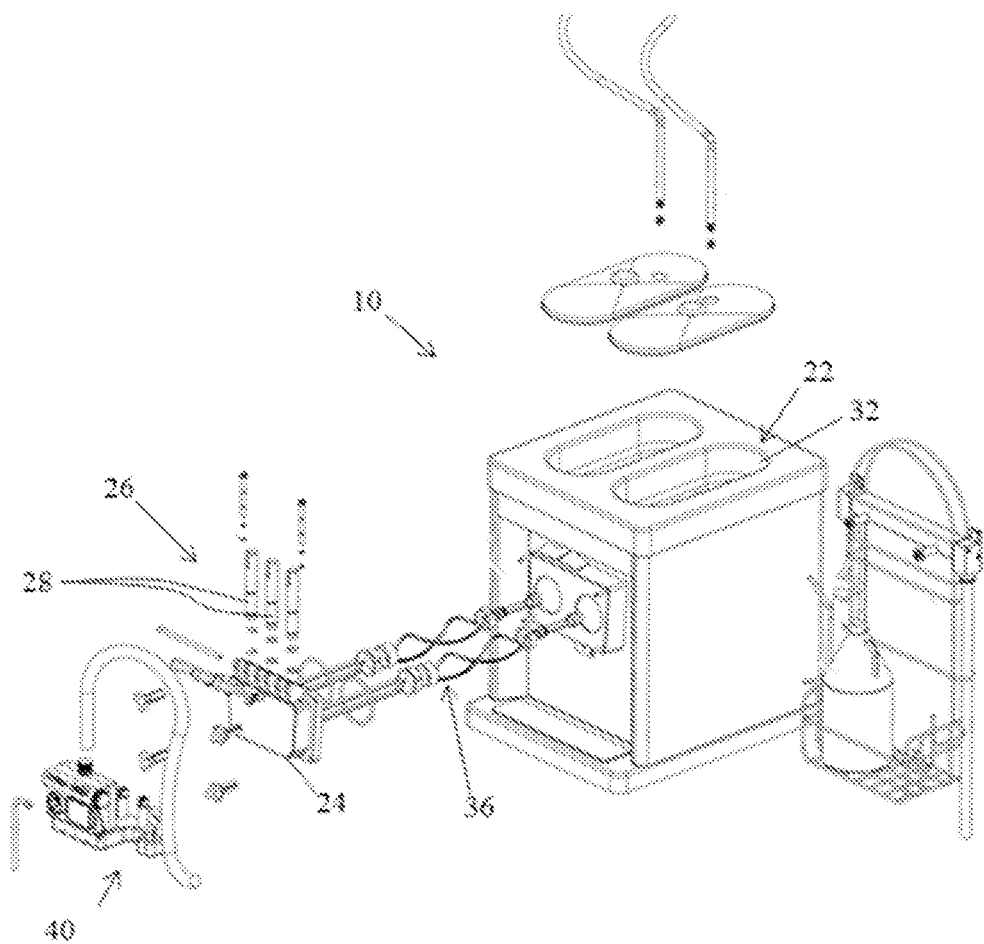
FIG. 1 is an exploded perspective view of a representative food processor and a portion of one configuration of the present system.

Referring to FIG. 1, a representative food processor 10 is shown. The food processor 10 can be any of a variety of configurations including, but not limited to, frozen or chilled food product including but not limited to, beverages such as sodas, beer or wine as well as cooked and/or extruded food product.

Food Processor

Figure 2:
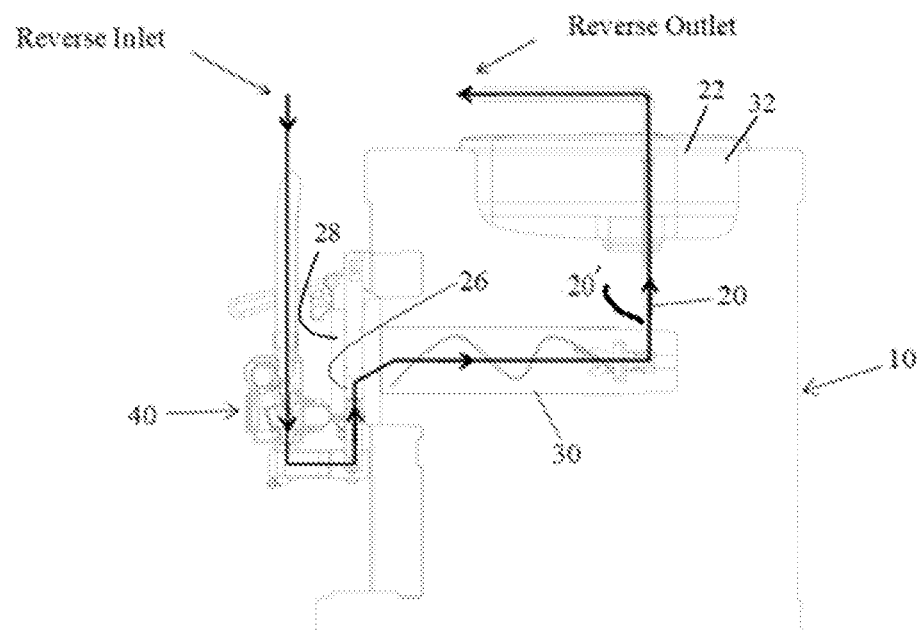
FIG. 2 is a side elevational view of a representative food flow path in a food processor showing a reverse flow as contemplated in the present system.

Referring to FIGS. 1 and 2, in one configuration, the food processor 10 includes a first food flow path 20 and a second food flow path 20' extending from an input or upstream portion or end 22, such as a reservoir, feed tube, line inlets or a hopper 32 to an output or downstream portion or end 24, such as a dispensing interface 26 from which the food product exits the food processor.

Although the food processor 10 is set forth in terms of first food flow path and a second food flow path, it is understood that an additional plurality of flow paths can be employed such as three, four, five or more. As set forth below, the present disclosure is readily scalable to accommodate additional flow paths.

The food product passes, in a normal or forward direction alone each food flow path 20, from the input end 22 to the output end 24. Thus, in terms of the normal or forward flow direction along each food flow path 20, each path includes an upstream portion and a downstream portion.

In certain configurations, the dispensing interface 26 includes at least one dispensing valve 28 for selectively passing or allowing passage of the processed food product from the food processor 10. In certain configurations, the dispensing interface 26 includes a plurality of dispensing valves 28, such as but not limited to one, two, three or more. It is contemplated that each food flow path 20 can include a dispensing valve 28 or a plurality of food flow paths can terminate at a given dispensing valve.

The food processor 10 can include any variety of devices, including but not limited to soft serve machines, batch freezers, slush freezers, shake freezers, blended ice machines or food processors for extruding food products which include flows, grains or meats as well as liquid dispensers for beverages including soft drinks, dairy drinks or alcoholic beverages such as fermented or distilled spirits. Thus, the food product can be any corresponding product for consumption, wherein the food product may be subjected to processing that includes temperature control, food product mixing, blending, altering, processing or extruding by the food processor 10.

In certain configurations as seen in FIGS. 1 and 2, each food flow path 20 incorporates a number of processing stations 30 intermediate the upstream end 22 (such as the hopper) and the downstream end 24, (such as the dispensing valve 28). For example, the processing stations 30 can include mixing chambers and temperature control chambers along the food flow path 20. The mixing chambers include chambers for mixing ingredients provided in a stream as well as ingredients from different inputs such that the mixing chamber is the volume of initial combination of different ingredients.

In further configurations, processing chambers 30, such as the mixing chamber and/or temperature control chamber of FIG. 2 can include a blade or beater assembly 36 for agitation of the food product within the chamber, such as by rotation within the chamber.

Alternatively, each food flow path 20 can function primarily as a conduit from the input end 22 to the dispensing interface 26. In these configurations it is understood the food processor 10 can function merely to selectively dispense the food product or can provide an alteration or conditioning of the food product such as temperature change, carbonation as well as mixing (compounding). Examples of the food processor 10 having these food flow paths 20 include dispensing devices such as automated soda dispensers, beer and wine dispensers.

It is further understood each food flow path 20 can include a plurality of inputs 22 with a corresponding smaller or a greater number of outputs 24 depending on the intending operating function of the food processor 10.

A representative food flow path 20 through the food processor, with the reverse direction indicated by arrows, is shown in FIG. 2.

While the input or upstream end 22 of the food flow path 20 is shown in FIG. 2, above the output or downstream end, it is understood the input can be located below the output, wherein the food product is pumped up from a supply, hopper or reservoir and along the food flow path to exit at the dispensing interface 26.

In certain instances of cleaning or maintaining the food processor 10, a solution is passed through at least a portion of the food flow paths.

The term solution is intended to encompass a cleaning, rinsing, sanitizing, disinfecting or sterilizing solution, as well as combinations or mixtures. For purposes of description, the present system is set forth in terms of using the solution, however it is understood the term solution encompasses cleaning agents as well as water (or other liquid) such as a rinse that may be employed. The term solution also includes a gas or vapor such as steam as well as other disinfecting gas. It is understood, the present system can employ any of a variety of cleaning, rinsing, sanitizing, disinfecting or sterilizing solution materials including liquids, gases and combinations thereof. The solution can be at least partly formed by an addition of an acidic or basic wash concentrate to public utility water. Exemplary acidic washes for the solution include citric, lactic, malic, acetic, adipic, fumaric, glutaric, tartaric, fumaric, succinic, propionic, aconitic, sorbic, gluconic, ascorbic, and/or humic acids and at least one of sodium dodecyl sulfate and sodium lauryl sulfate.

The flow of the solution through the portion of the food flow paths 20 can be in the forward, normal direction or a reverse direction. The normal, or forward flow, originates at the input 22, or at least an upstream location spaced from the dispensing interface 26, and terminates at the output 24, or at least a downstream location nearer to the dispensing interface. The reverse flow originates at the output end 24, or at least downstream location (relative to the forward flow) and terminates at the input end 22, or at least an upstream location (relative to the forward flow).

In those configurations in which an introduction manifold 40 is used to introduce the flow of solution to the flow paths 20, the flow of solution through each food flow path may not be of equal flow rate, velocity or pressure. The introduction manifold 40 is configured to receive a supply of solution, typically a single line, and output the solution to a plurality of outlets for introducing the split solution flow to the respective food flow paths 20. The introduction manifold 40 can incorporate or be fluidly connected to a pressure regulating valve for limiting the pressure of the solution introduced into the food flow path. In those instances in which the flow of solution is introduced into the food flow path 20 to clean, rinse, sanitize, disinfect or sterilize the food flow path, a reduced flow, from different flow resistance in one of the food flow paths 20, can result in insufficient exposure of the food flow path to the solution. The insufficient exposure can lead to insufficient treatment of the food flow path 20.

Similarly, where the introduction manifold 40 is used to introduce the reverse flow of solution to the flow paths, the reverse flow through each food flow path may not be of equal flow rate, velocity or pressure. In those instances in which the reverse flow of solution is used to clean, rinse, sanitize, disinfect or sterilize the food flow path 20, a reduced flow, from different flow resistance in one of the food flow paths, can result in insufficient exposure of the food flow path to the solution. The insufficient exposure can lead to insufficient treatment of the food flow path 20.

The present system provides for substantially equal flow of solution through the respective food flow path 20, or portion of the food flow path, when the food flow path is connected to a bypass line 60 for passing the solution from the food flow path.

The bypass line 60 is employed for implementing flow of the solution through the food flow paths 20. The bypass line 60 includes a bypass line inlet or interface 62 that can be releasably connected to the respective food flow path 20 or integrally connected to the food flow path, wherein a bypass valve (not shown) is used to selectively expose the bypass line to the respective food flow path. The bypass line 60 can connect to the food flow path 20 by any of a variety of commercially available connectors, such as but not limited to quick connect, snap, threads or even friction fit.

The bypass line 60 includes a bypass line outlet or interface 64. Depending on the configuration of the food processor 10, the bypass line outlet 64 can be merely an open end of the line or any of a variety of commercially available connectors, such as but not limited to quick connect, snap, threads or even friction fit for connecting to a further portion of the system as set forth herein.

In one configuration, the system provides one bypass line 60 for each food flow path 20. Thus, for a single food flow path 20, a single bypass line 60 is employed and for the food processor 10 having a plurality of food flow paths 20, a corresponding plurality of bypass lines 60 is employed.

The bypass line 60 includes or is in fluid communication with a pressure regulating valve 80, such that flow passing through the bypass line, or bypass lines, is subject to a common pressure by virtue of the pressure regulating valve. That is, the pressure regulating valve 80 precludes passage of solution when exposed to a certain pressure and permits passage of solution in response to a greater pressure. Specifically, in those configurations of a single food flow path 20 and hence single bypass line 50, the pressure regulating valve 80 can be located within the bypass line. In those configurations having a plurality of food flow paths 20 and hence corresponding plurality of bypass lines 60, the flow in each bypass line is subject to the pressure regulation from the single pressure regulating valve 80.

The pressure regulating valve can be any of a variety of commercially available pressure regulating valves including, but not limited to predetermined, fixed, dynamic, self-adjusting and adjustable cracking pressure. Alternatively, the pressure regulating valve 80 can be configured as a portion of the bypass line 60 such as a trap including but not limited to "U", "S", or "J" shaped traps which provide the dominant flow resistor.

The present system provides for substantially equal solution flow through each of the bypass lines 60 (and hence food flow paths 20) by providing substantially equal pressures at a given location within the respective connected bypass line. Generally, a dominant flow resistor is disposed in (or is in fluid communication with) the flow in the bypass line 60. The dominant flow resistor is selected to dominant all other fluidic resistances in the food flow path 20 as well as the bypass line 60. That is, the dominant flow resistor is sufficient to determine the presence or absence of the flow through a respective food flow path 20.

In one configuration, the dominant flow resistor is the pressure regulating valve 80 such as a pressure regulating check valve. The pressure regulating valve 80 is known in the art, and is configured to prelude passage of fluid at less than a certain pressure and permit the passage of fluid above the given pressure. The pressure regulating valve 80 includes a pressure regulating valve inlet 82 and a pressure regulating valve outlet 84, with a pressure regulating mechanism intermediate the pressure regulating valve inlet and the pressure regulating valve outlet.

Generally, each bypass line 60 is in fluid communication with the pressure regulating valve 80, at the pressure regulating valve inlet 82. As the dominant flow resistor, the pressure regulating valve 80 is selected to dominant all other fluidic resistances in the food flow path 20 and the bypass line 60.

Upon connecting the bypass line or bypass lines 60 to the respective food flow paths 20, the flow of solution within each food flow path is subject to the same back pressure created by the pressure regulating valve 80. The equalization of pressure within the bypass lines 60 balances the otherwise different flow rates among the plurality of bypass lines, thereby improving the balancing of the flow of solution through each of the connected food flow paths 20. Thus, the pressure or flow of solution within each food flow path is sufficiently equal to provide the intended treatment of the portion of the food flow path exposed to the solution.

The exposure of the plurality of bypass lines 60 to the pressure regulating valve 80 can be accomplished by a discharge manifold 90 having a plurality of discharge manifold inlets 92 sufficient to fluidly connect to the plurality of bypass lines 60 (and indirectly to the food flow paths 20). The number of discharge manifold inlets 90 can be as many as necessary to fluidly communicate with each bypass line 60, such as two, three or twenty or more inlets. Thus, the discharge manifold 90 exposes each of the bypass lines 60 (and hence food flow paths 20) to the pressure regulation of the pressure regulating valve 80.

In those systems having a single food flow path 20, the pressure regulating valve 80 can be located within or at the inlet or the outlet of the bypass line 60. In those systems having a plurality of food flow paths 20, the discharge manifold 90 can be employed to fluidly connect each bypass line 60 to an inlet 92 of the manifold, wherein an outlet 94 of the manifold is exposed to or fluidly connected to the pressure regulating valve 80 at the pressure regulating valve inlet 82. In this configuration, the combined flows of solution exit the pressure regulating valve 80 along a common drain, transfer, discharge or recirculating line.

The length of the bypass line 60 from the food flow path 20 to the pressure regulating valve 80 can be determined by the operating and cleaning parameters of the food processor 10. Thus, the bypass line 60 encompasses locating the pressure regulating valve 80 immediately adjacent or proximate to the food flow path 20 or spacing the pressure regulating valve by a length of the tubing from the food flow path.

Generally, each bypass line 60 is exposed to, in fluid communication with, the pressure regulating valve 80, wherein the pressure regulating valve is selected to dominant all other fluidic resistances in the food flow path as well as the respective bypass line. That is, the pressure regulating valve 80 is sufficient to determine the presence of the solution flow through a respective bypass line 60 and hence food flow path 20. The pressure regulating valve 80 provides substantially equal flow pressures at a given location, such as at the pressure regulating valve.

The fluid communication of each bypass line 60 to the pressure regulating valve 80 can be direct in the configurations of a single food flow path 20 and single bypass line; through the discharge manifold 90; or through at least one shunt 130.

The shunt 130 can fluidly connect one bypass line 60 to a second bypass line upstream of the solution flow reaching the pressure regulating valve 80. The shunt 130 can function in place of the discharge manifold or depending on the configuration of the food processor can function in cooperation with the discharge manifold. The shunt 130 can be employed by fluidly connecting one bypass line 60 with a second bypass line upstream of the pressure regulating valve 80 or the discharge manifold.

Figure 3:
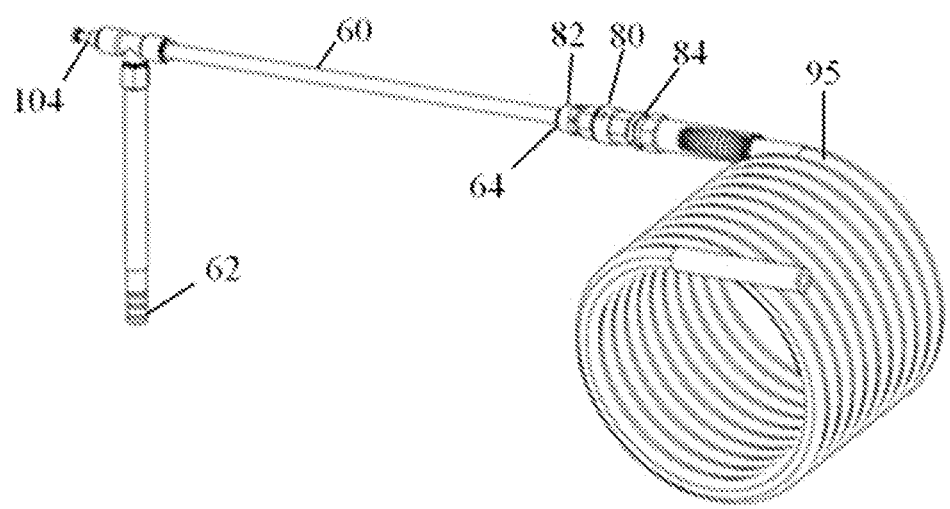
FIG. 3 is a perspective view of a single bypass line having a pressure regulating valve.
Figure 4:
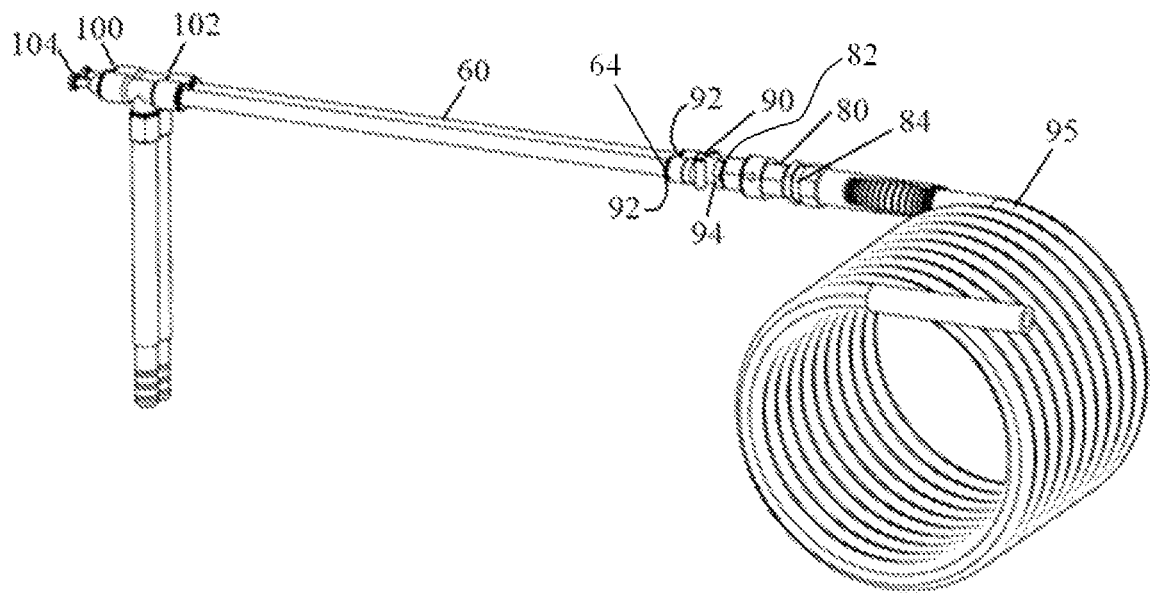
FIG. 4 is a perspective view of a plurality of bypass lines with a discharge manifold connecting the plurality of bypass lines to a pressure regulating valve.
Figure 5:
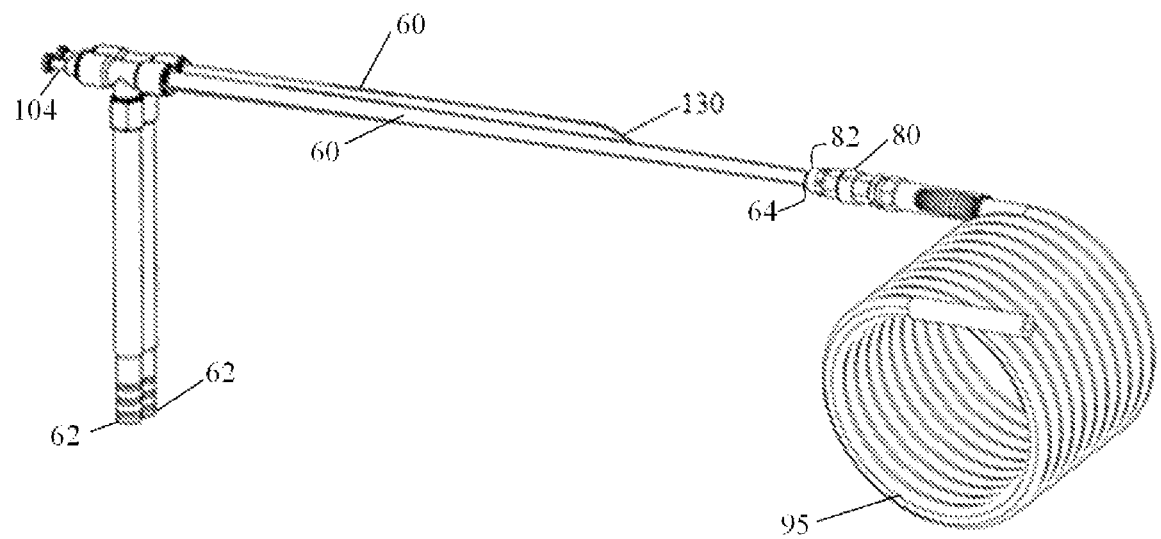
FIG. 5 is a perspective view of a plurality of bypass lines with a shunt and having a pressure regulating valve.

As seen in FIGS. 3 and 4, the bypass line 60 can further include an access port 100 such as a T 102, wherein one port of the T functions as an inlet, a second port functions as an outlet and a third port functions as the access port. A removable plug 104 can be used to selectively open/close the access port 100. The removable plug 104 can also be an anti-siphon valve or a hybrid, such as a removable anti-siphon valve. For purposes of description, the removable plug 104 is set forth as a removable plug or anti-siphon valve (ASV), but is understood to include either the plug or the ASV individually as well as the hybrid configuration. When the access port 100 is opened, a mechanical or supplemental cleaning instrument, such as a brush, can be operably inserted into a portion of the bypass line 60 to assist in cleaning the line. In addition, the plug 104 can be removed to reduce or break any vacuums generated during the cleaning process.

In FIG. 3, the bypass line 60 for a single food flow path 20 is shown, wherein the pressure regulating valve 80 is distal to the connection of the bypass line to the food flow path. The output of the pressure regulating valve 80 then passes to tubing 95 that can be a drain, transfer, discharge or recirculating line.

In FIG. 4, two bypass lines 60 are shown connected to the discharge manifold 90, wherein the discharge manifold passes the combined flow to the pressure regulating valve 80. As in the single bypass line configuration, the output of the pressure regulating valve 80 then passes to tubing 95 that can be a drain, transfer, discharge or recirculating line.

As set forth above, the connection of the bypass line 60 to the food flow path 20 can be at any location along the food flow path, such as at either the inputs 22 (or upstream end), the outputs 24 (or the downstream end) or intermediate the inputs and the outputs. Thus, the solution can flow through at least a portion of the food flow path 20 in either a reverse or a forward direction.

During flow of the solution through the food flow path 20, it is also advantageous to control the pressure drop across the food flow path, thus one configuration contemplates a control of the amount of head or "siphon" that gets generated by difference in system heights.

In an alternative configuration, each bypass line 60 connected or connectable to each food flow path 20, includes the pressure regulating valve 80, such as the pressure regulating valve that regulates pressure at the exit end of the system/fluidic path(s) having the solution flow.

In certain configurations, the bypass line 60 also incorporates a vent valve as the ASV 104 to release any potential siphon created by gravity and height variations from the origination of the reverse flow and the bypass lines, hence the (ASV) is employed in the system. One configuration of the ASV 104 includes a one way valve (check valve) with 0.1 to 1 psi cracking pressure and allows air to enter the system at flow rates of 0.01 to 10 CFM and vented to ambient conditions.

In one configuration, the bypass lines 60 are releasably engaged to the food flow path 20, typically at the upstream end (relative to the forward flow through the food flow path) or the downstream end. The engagement of the bypass lines 60 to the food processor 10 can be by any of a variety of commercially available connectors, such as but not limited to quick connect, snap, threads or even friction fit.

The bypass line 60 can function as a transition of the machine end of the food flow path (the upstream end, the downstream end, or an intermediate location) to the pressure regulating valve 80. As shown in FIG. 4, the pressure regulating valve 80 can connect to a chamber or housing which also connects or houses the ASV 104 and as well as connects to the drain, transfer, discharge or recirculating line 95. It is contemplated that each bypass line 60 is connected to a corresponding drain, transfer, discharge or recirculating line, however it is understood a first bypass line 60 can be connected to a second bypass line 60 by the shunt 130 located intermediate the pressure regulating valve 80 and ASV 104 in each bypass line. The shunt 130 directs the flow of solution from one bypass line 60 to another bypass line and depending on the number of food flow paths and shunts can obviate the need for the discharge manifold 90 as the flows of all the bypass lines pass to the single pressure regulating valve inlet.

In those configurations employing a reverse or a forward flow of the solution through at least a portion of the food flow path 20, the ASV 104 is between the food flow path 20 and the pressure regulating valve 80.

The interconnection of the bypass line 60, the ASV 104 and/or the pressure regulating valve 80 can be any of a variety of commercially available connectors, such as but not limited to quick connect, snap, threads or even friction fit.

The solution can be presented to the food processor 10 through internal or external interfaces. In those interfaces employing the introduction manifold 40 or a distribution connection, wherein the solution pressure is substantially equal at each food flow path 20, the present system provides for a balanced flow of solution through the respective food flow paths.

In operation, as solution flows through the food flow path 20 and into the connected bypass lines 60 to contact the pressure regulating valve 80, the pressure regulating valve begins to regulate the solution pressure in the bypass lines 60 and hence in the food flow paths to ensure that the pressure drop across the paths is consistent; enabling uniform flow rates through each food flow path.

Location of the ASV 104 prevents the food flow path 20 in the food processor 10 from being purged or emptied of solution by the solution flowing out the bypass lines.

Upon completion of the desired passage of solution through the food flow paths 20, it is contemplated that in order to properly drain the solution from food flow paths in the food processor 10, the bypass lines 60 can be disconnected from the food processor or the ASV 104 can be actuated to allow air to enter the food flow path(s) as the solution drains out of the food flow paths.

Thus, the present system provides that when the solution is flowing through the bypass lines 60, the pressure regulating valve 80 regulation of the solution pressure at the pressure regulating valve provides at least substantially equal flow through each food flow path 20. In those configurations employing the ASV 104, the ASV prevents back flow by allowing air to enter the drain line if a siphon exists. With equivalent path resistance and total pressure drop the solution flow through each path will be equivalent.

It is contemplated the bypass lines 60 can be configured as a kit, having a plurality of bypass lines wherein the interface for engaging the food processor 10, the cracking pressure of the pressure regulating valve 80, lengths and inclusion of any anti-siphon components are specific to a given kit.

The present system can provide regulated pressure flow of the solution in either a reverse flow through the food flow paths 20 from a common source, such as the introduction manifold 40, to the bypass lines 60 and the pressure regulating valve 80, as well as a forward flow of solution through the food flow paths, wherein the bypass lines are disposed at the downstream portion.

The system has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A food processor comprising:
   (a) a first food flow path extending from an first upstream input end to a first downstream output end;
   (b) a first freezer chamber in the first food flow path intermediate the first upstream input end and the first downstream output end;
   (c) a first bypass line configured to connect to the first food flow path intermediate the first upstream input end and the first downstream output end to receive a flow from the first food flow path into the first bypass line; and
   (e) a first pressure regulating valve having a pressure regulating valve inlet and a pressure regulating valve outlet, wherein the pressure regulating valve inlet fluidly communicates with the first bypass line.

2. The food processor of claim 1, wherein the first food flow path includes an upstream portion including the first upstream input end, and wherein the first bypass line is connected to the upstream portion of the first food flow path.

3. The food processor of claim 1, wherein the first food flow path includes a downstream portion including the first downstream output end, and wherein the first bypass line is connected to the downstream portion of the first food flow path.

4. The food processor of claim 1, wherein the first bypass line is releasably connected to the first food flow path.

5. The food processor of claim 1, wherein the first bypass line is integrally connected to the first food flow path.

6. The food processor of claim 1, wherein the first pressure regulating valve has one of a predetermined, fixed, dynamic, self-adjusting and adjustable cracking pressure.

7. The food processor of claim 1, wherein the outlet of the first pressure regulating valve is connected to one of a drain, transfer, discharge and recirculating line.

8. A food processor comprising:
   (a) a first food flow path extending from an first upstream input end to a first downstream output end;
   (b) a second food flow path extending from a second upstream input end to a second downstream output end;
   (c) a first bypass line configured to connect to the first food flow path intermediate the first upstream input end and the first downstream output end;
   (d) a second bypass line configured to connect to the second food flow path intermediate the second upstream input end and the second downstream output end; and
   (e) a first pressure regulating valve having a pressure regulating valve inlet and a pressure regulating valve outlet, wherein the pressure regulating valve inlet fluidly communicates with the first bypass line and the second bypass line.

9. The food processor of claim 8, wherein the first food flow path includes a first upstream portion including the first upstream input end, and wherein the first bypass line is connected to the first upstream portion of the first food flow path.

10. The food processor of claim 8, wherein the first food flow path includes a first upstream portion including the first upstream input end, and wherein the first bypass line is connected to the first upstream portion of the first food flow path, wherein the second food flow path includes a second upstream portion including the second upstream input end, and wherein the second bypass line is connected to the second upstream portion of the second food flow path.

11. The food processor of claim 8, wherein the first food flow path includes a first downstream portion including the first downstream output end, and wherein the first bypass line is connected to the first downstream portion of the first food flow path.

12. The food processor of claim 8, wherein the first bypass line is releasably connected to the first food flow path.

13. The food processor of claim 8, wherein the first bypass line is integrally connected to the first food flow path.

14. The food processor of claim 8, wherein the first pressure regulating valve has one of a predetermined, fixed, dynamic, self-adjusting and adjustable cracking pressure.

15. The food processor of claim 8, wherein the outlet of the first pressure regulating valve is connected to one of a drain, transfer, discharge and recirculating line.

16. The food processor of claim 8, further comprising a shunt fluidly connecting the first bypass line to the second bypass line intermediate the first food flow path the first pressure regulating valve.

\* \* \* \* \*